(12) United States Patent
Norizuki et al.

(10) Patent No.: US 6,650,625 B1
(45) Date of Patent: Nov. 18, 2003

(54) RING NETWORK SYSTEM (75) Inventors: Akira Norizuki, Shizuoka (JP);
Akiyoshi Tomita, Shizuoka (JP);
Kazuyoshi Unno, Shizuoka (JP);
Katsutoshi Nakajima, Shizuoka (JP);
Hiroshi Nishiyama, Shizuoka (JP);
Yoshikazu Saito, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/348,570

(22) Filed: Jul. 7, 1999

(30) Foreign Application Priority Data

Jul. 8, 1998 (JP) .......................................... 10-193422

(51) Int. Cl.$^7$ ............................................. H04L 12/28
(52) U.S. Cl. ...................................... 370/254; 370/403
(58) Field of Search ................................. 370/254, 257, 370/258, 403, 404, 405, 452, 453, 460; 709/250, 251, 252; 359/119, 125

(56) References Cited

U.S. PATENT DOCUMENTS 4,759,015 A * 7/1988 Takai et al. ................. 370/216
5,444,695 A * 8/1995 Copley et al. .............. 370/452
5,801,859 A * 9/1998 Yamamoto .................. 359/119
6,343,331 B1 * 1/2002 Stirling ...................... 709/251

* cited by examiner

Primary Examiner—Ajit Patel
Assistant Examiner—Chirag Shah
(74) Attorney, Agent, or Firm—Sughrue Mion, PLLC (57) ABSTRACT In a ring network system in which a plurality of devices each having a first communication IC are connected in a ring-like manner by a transmission line to mutually effect transmission and reception of data among the devices, an rack unit is disposed between two adjacent ones of the plurality of devices, the rack unit and the plurality of devices are connected in the ring-like manner by the transmission line, wherein the rack unit has a plurality of device inserting slots in which a plurality of additional devices are installed and which are provided in correspondence with the plurality of additional devices, and a second communication IC for controlling data communication among the plurality of additional devices installed in the plurality of device inserting slots and for controlling data communication between the additional device and the network device.

6 Claims, 11 Drawing Sheets

RING NETWORK SYSTEM

BACKGROUND OF THE INVENTION

1. Field of the Invention

The present invention relates to a ring network system in which a plurality of devices provided in a vehicle are connected in a ring-like manner by a transmission line to mutually effect data communication among the devices. More particularly, the present invention relates to a ring network system which facilitates addition of devices to expand the network and which permits addition of a device not having a communication integrated circuit to the network.

The present application is based on Japanese Patent Application No. Hei. 10-193422, which is incorporated herein by reference.

2. Description of the Related Art

Figure 13:
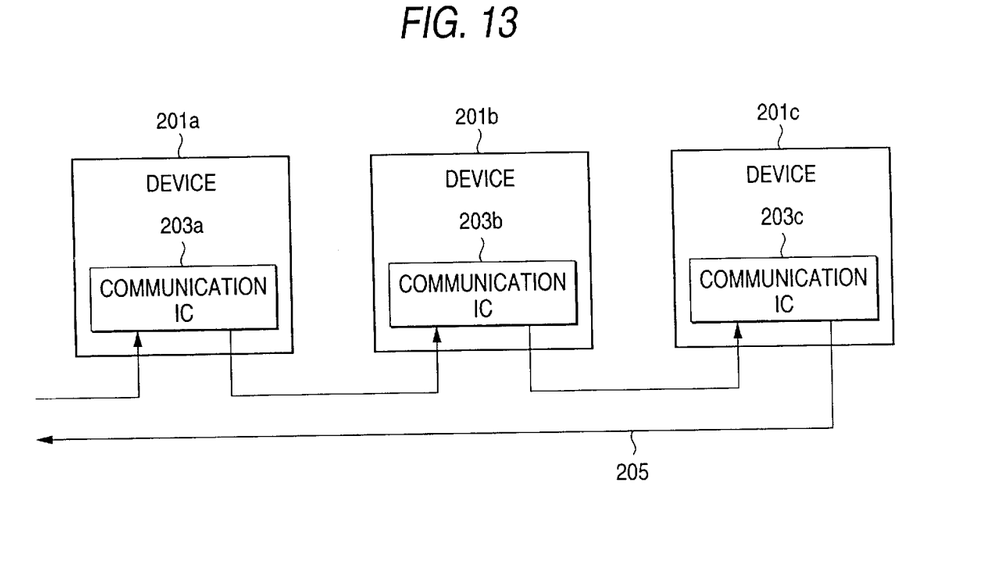
FIG. 13 is a block diagram illustrating one example of the related ring network system.

A block diagram of the related ring network system provided in a vehicle is shown in FIG. 13. As shown in FIG. 13, the ring network system is configured such that a device 201a having a communication integrated circuit (communication IC) 203a for controlling the transmission and reception of data, a device 201b having a communication IC 203b, and a device 201c having a communication IC 203c are respectively connected in a ring-like manner by a transmission line 205.

These devices are devices such as a radio tuner, an amplifier, a compact disk player (hereafter referred to as the CD player), a cassette deck, and the like, and data communication is mutually effected among the devices. For example, a CD signal can be sent to the amplifier through the transmission line by operating the CD player, and the CD signal can be amplified by the amplifier, and the sound can be outputted from a speaker.

In addition, in a case where the ring network system for effecting data communication at high speed is configured, transmission lines such as optical fibers capable of high-speed data transmission are used.

However, with the ring network system shown in FIG. 13, the transmission lines such as the optical fibers are required for connecting the adjacent devices, and it has been necessary to provide an optical connector for each device. For this reason, since the configuration of the ring network system becomes complex, it has been difficult to further add devices to the network and expand the network.

Furthermore, with an ordinary ring network system, since the configuration provided is such that the devices having the communication ICs are connected to the transmission line, a non-network device (analog device) which does not have a communication IC is extremely difficult to add to the same ring network system.

Figure 14:
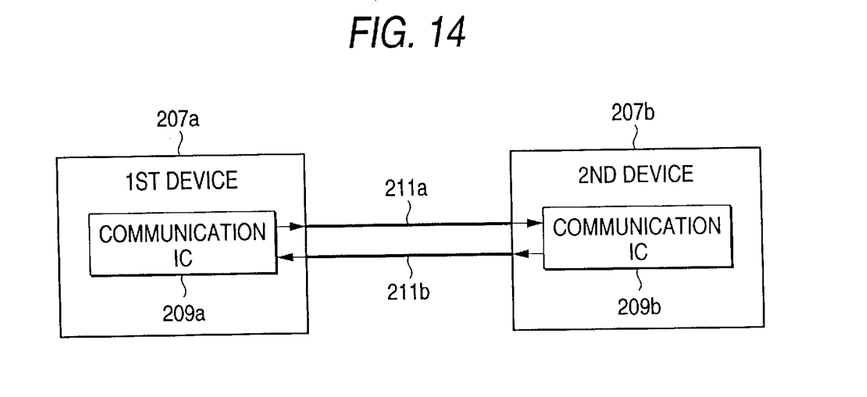
FIG. 14 is a block diagram illustrating the related ring network system which is configured by devices provided as standard equipment.

Meanwhile, a ring network system such as the one shown in FIG. 14 is configured such that a first device 207a having a communication IC 209a and a second device 207b having a communication IC 209b are provided as standard equipment, and are connected in a ring-like manner by transmission lines 211a and 211b.

Figure 15:
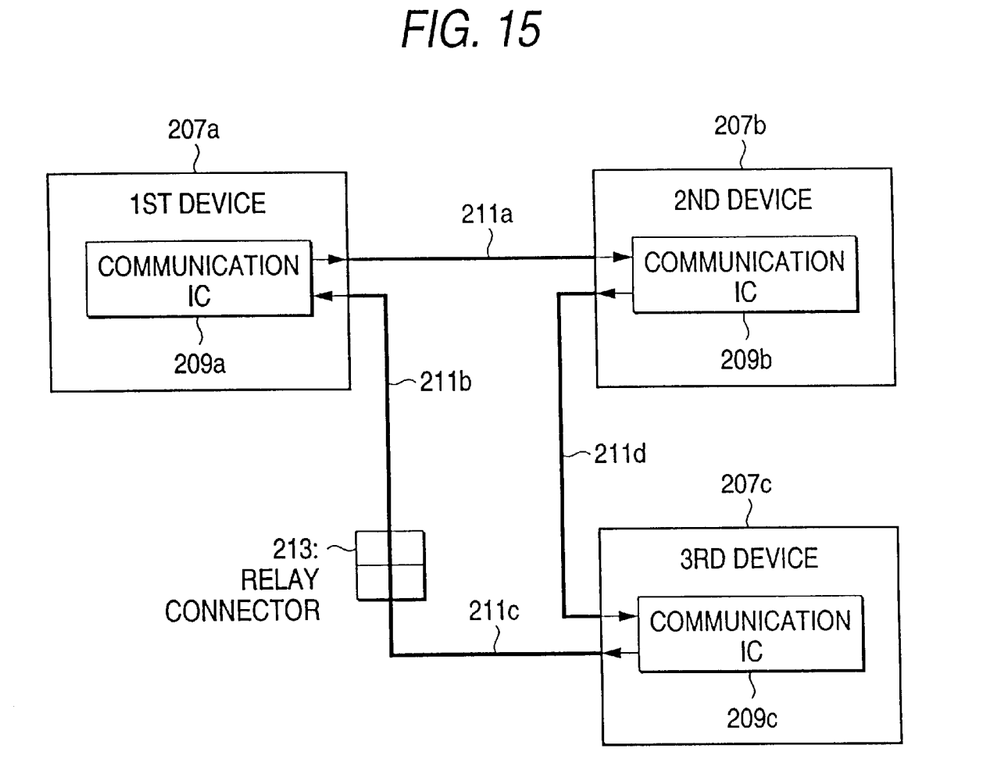
FIG. 15 is a block diagram illustrating a ring network system which is configured by adding a new device to the ring network system shown in FIG. 14.

In this case, the positions of the first device 207a and the second device 207b, the wiring routes of the transmission lines 211a and 211b, the length of the transmission lines, and the like are already set in many cases. For this reason, as shown in FIG. 15, if a third device 207c is newly added to the ring network system, it has been necessary to further provide a relay connector 213 and transmission lines 211c and 211d.

In addition, in the case where optical fibers are used, a light signal is substantially attenuated, and waveform distortion, jitter, and the like occur due to the relay connector 213. For this reason, there has been a problem in that normal communication cannot be effected.

SUMMARY OF THE INVENTION

Accordingly, a primary object of the present invention is to provide a ring network system which is capable of effecting addition of devices and expansion of the network easily with a simple configuration.

A secondary object of the present invention is to provide a ring network system which is capable of effecting addition of devices and expansion of the network without changing the positions of the existing devices and the routing forms of the existing transmission lines.

To this end, in accordance with a first aspect of the present invention, there is provided a ring network system in which a plurality of network devices each having a first communication control unit for controlling data communication are connected in a ring-like manner by a transmission line to mutually effect transmission and reception of data among the network devices, comprising: an addition unit disposed between two adjacent ones of said plurality of network devices, said addition unit and said plurality of network devices being connected in the ring-like manner by said transmission line, wherein said addition unit has a plurality of device inserting slots in which a plurality of additional devices are installed and which are provided in correspondence with said plurality of additional devices, and a second communication control unit for controlling data communication among said plurality of additional devices installed in said plurality of device inserting slots and for controlling data communication between said additional device and said network device.

In accordance with the above-described first aspect of the invention, if a plurality of additional devices are installed in the plurality of device inserting slots provided in the addition unit, data communication can be effected among the plurality of additional devices installed in the plurality of device inserting slots, and data communication can be effected between each additional device and said network device. Namely, by merely installing the additional device in the device inserting slot, the system can be configured automatically, and devices can be easily added to expand the network.

In accordance with a second aspect of the present invention, said plurality of additional devices may be said network devices each having said first communication control unit. Alternatively, in accordance with a third aspect of the present invention, said plurality of additional devices may be non-network devices each not having said first communication control unit.

In accordance with a fourth aspect of the present invention, the ring network system according to the first aspect of the invention further comprises: a device determining unit which, on the basis of a signal sent from said additional device installed in said device inserting slot, determines whether said additional device is said network device having said first communication control unit or a non-network device not having said first communication control unit.

In accordance with the above-described fourth aspect of the invention, since the device determining unit determines whether said additional device is said network device having said first communication control unit or a non-network device not having said first communication control unit, it is possible to control the installed device according to the network device and the non-network device.

In accordance with a fifth aspect of the present invention, in the ring network system according to the fourth aspect of the invention, said second communication control unit includes: a first selecting portion which, if said device determining unit has determined that said additional device is said non-network device, selects said non-network device on the basis of a result of the determination; a second selecting portion which, if said device determining unit has determined that said additional device is said network device, selects said network device on the basis of a result of the determination; a converting portion for converting a signal in a first form from said non-network device selected by said first selecting portion into a signal in a second form of said network device; and a communication portion for transmitting the signal in the second form converted by said converting portion to one of said plurality of network devices.

In accordance with the above-described fifth aspect of the invention, if it is determined that the additional device is a non-network device, the first selecting portion. selects the non-network device, whereas if it is determined that the additional device is a network device, the second selecting portion selects the non-network device.

Then, if the converting portion converts a signal in a first form from said non-network device selected by said first selecting portion into a signal in a second form of said network device, the communication portion transmits the signal in the second form to one of said plurality of network devices, so that communication can be effected from the non-network device to the network device.

In accordance with a sixth aspect of the present invention, in the ring network system according to the fifth aspect of the invention, said communication portion receives the signal in the second form from said network device on said transmission line, and outputs the same to said converting portion; said converting portion converts the signal in the second form from said communication portion into the signal in the first form; and said first selecting portion outputs the signal in the first form from said converting portion to said non-network device installed in said device inserting slot.

In accordance with the above-described sixth aspect of the invention, since said communication portion receives the signal in the second form from said network device on said transmission line and outputs the same to said converting portion, said converting portion converts the signal in the second form from said communication portion into the signal in the first form, and said first selecting portion outputs the signal in the first form from said converting portion to said non-network device installed in said device inserting slot, communication from the network device to the non-network device installed in the device inserting slot can be effected.

In accordance with a seventh aspect of the present invention, the ring network system according to the first aspect of the invention further comprises: an installation determining unit which, on the basis of the signal sent from said additional device, determines whether or not said additional device has been installed in said device inserting slot.

In accordance with the above-described seventh aspect of the invention, on the basis of the signal sent from said additional device, it is possible to determine whether or not said additional device has been installed in said device inserting slot.

In accordance with an eighth aspect of the present invention, there is provided a ring network system in which a plurality of devices each having a communication control unit for controlling data communication are connected in a ring-like manner by a first transmission line to mutually effect transmission and reception of data among the devices, comprising: an additional device having said communication control unit, a second transmission line, and a waveform shaping device, wherein said plurality of devices, said additional device, and said waveform shaping device are connected in the ring-like manner by said first transmission line and said second transmission line, and said waveform shaping device shapes the waveforms of signals included in the data on said first transmission line and said second transmission line and amplifies the signals.

In accordance with the above-described eighth aspect of the invention, in a case where an additional device is to be added to the network having a plurality of existing devices, by merely providing the second transmission line and the waveform shaping device it is possible to configure the ring network system without changing the positions of the plurality of existing devices and the wiring route and length of the first transmission line.

The above and other objects, features and advantages of the present invention will become more apparent from the following detailed description of the invention when read in conjunction with the accompanying drawings.

DETAILED DESCRIPTION OF THE PREFERRED EMBODIMENTS

Referring now to the accompanying drawings, a detailed description will be given of the embodiments of the ring network system in accordance with the present invention.

First Embodiment

Figure 1:
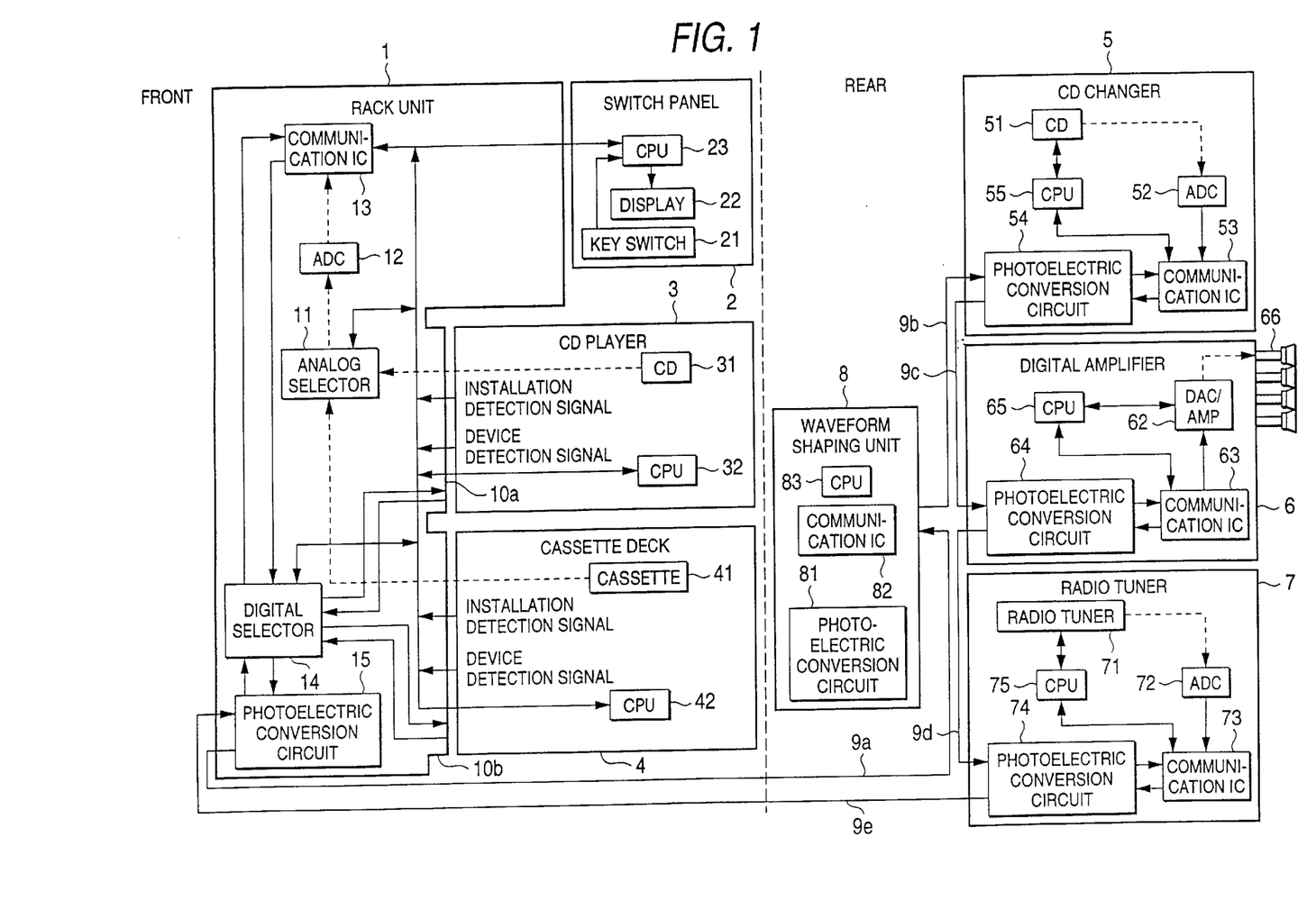
FIG. 1 is a block diagram illustrating the configuration of the ring network system in accordance with a first embodiment of the present invention.

FIG. 1 shows a block diagram of the configuration of the ring network system in accordance with a first embodiment of the present invention.

As shown in FIG. 1, this ring network system is mounted in a vehicle, and comprises a rack unit 1, a switch panel 2, a CD player 3 which is an analog device (a non-network device) which does not have a communication IC, a cassette deck 4 which is an analog device, a CD changer 5 which is a digital device (network-capable device) having a communication IC, a digital amplifier 6 which is a digital device, a radio tuner 7 which is a digital device, and a waveform shaping unit 8 which is a digital device.

Here, if the received data is addressed to itself, the communication IC fetches that data, whereas if the received data is not addressed to itself, the communication IC sends the data as it is to the transmission line, and if there is any data to be transmitted, the communication IC sends the data to be transmitted to the transmission line.

The rack unit 1, the switch panel 2, the CD player 3, and the cassette deck 4 are respectively disposed on the front side of the vehicle, while the CD changer 5, the digital amplifier 6, and the radio tuner 7 are disposed on the rear side of the vehicle.

The respective digital devices, including the rack unit 1, the waveform shaping unit 8, the CD changer 5, the digital amplifier 6, and the radio tuner 7 are connected in a ring-like manner by transmission lines 9a to 9e to form a ring network system. The CD player 3 and the cassette deck 4 are arranged to be added to the ring network system through the rack unit 1.

For this reason, two device inserting slots 10a and 10b are provided in the rack unit 1, a tip portion of the CD player 3 is fitted in the device inserting slot 10a, and a tip portion of the cassette deck 4 is fitted in the device inserting slot 10b, thereby allowing the CD player 3 and the cassette deck 4 to be electrically connected to the rack unit 1.

It should be noted that the number of the device inserting slots is not limited to two, and three or more device inserting slots may be provided in correspondence with the structure of the device inserting slot and the number of devices.

Further, the rack unit 1 has an analog selector 11 for selecting the CD player 3 or the cassette deck 4 which are analog devices, an ADC 12 for converting an analog signal from the analog device into a digital signal, a communication IC 13 for inputting the digital signal from the ADC 12, a digital selector 14 for selecting a digital device, and a photoelectric conversion circuit 15 for converting a light signal into an electrical signal or an electrical signal into a light signal. The communication IC 13 has a digital interface for the ring network system, a low-speed serial interface with respect to a CPU, and a digital audio interface with respect to the ADC (DAC).

The CD player 3 has a CD 31 and a central processing unit (CPU) 32 for executing processing. The cassette deck 4 has a cassette 41 and a CPU 42.

The switch panel 2 is electrically connected to the rack unit 1, and has a key switch 21 for inputting commands for effecting the operation of the devices, a display 22 for displaying various data, and a CPU 23 for transmitting the commands and the like from the key switch 21 to the rack unit 1, receiving data from the rack unit 1, and performing switch control, display control, and so on.

On the basis of installation detection signals concerning the CD player 3 and the cassette deck 4, the CPU 23 determines whether or not the CD player 3 and the cassette deck 4 have been installed in the device inserting slots. In addition, on the basis of device detection signals concerning the CD player 3 and the cassette deck 4, the CPU 23 determines whether the CD player 3 and the cassette deck 4 are digital devices (devices incorporating communication ICs) or analog devices. As a result of the determination of the device, the CPU 23 effects a changeover to the analog selector 11 or the digital selector 14 by means of a selector control signal.

The CD changer has a CD 51, an ADC 52 for converting a CD signal from the CD 51 into a digital signal, a communication IC 53, a photoelectric conversion circuit 54, and a CPU 55 for controlling various parts.

The digital amplifier 6 has a DAC/AMP 62 for converting a digital signal into an analog signal and amplifying the analog signal, a communication IC 63, a photoelectric conversion circuit 64, and a CPU 65. A speaker 66 for outputting the sound is connected to the DAC/AMP 62 in the digital amplifier 6.

The radio tuner 7 has a radio tuner 71, an ADC 72 for converting a signal from the radio tuner 71 into a digital signal, a communication IC 73, a photoelectric conversion circuit 74, and a CPU 75.

The waveform shaping unit 8 has a photoelectric conversion circuit 81, a communication IC 82, and a CPU 83, and shapes the signal waveform by compensating for the attenuation of the light signal on the transmission line 9a, and eliminates the waveform distortion, the jitter and the like included in the light signal.

It should be noted that, in FIG. 1, dotted lines indicate analog signal lines, thick solid lines indicate high-speed communication lines, and thin solid lines indicate low-speed communication lines.

According to the above-described configuration, by fitting the CD player 3 and the cassette deck 4 provided in the rack unit 1 into the device inserting slots 10a and 10b, it is possible to easily effect addition of devices and expansion of the network.

Since the devices to be added are connected to the network by connector connection based on the slot structure, connecting cables are not particularly required, and special media such as optical connectors and optical fibers are not required.

Figure 2:
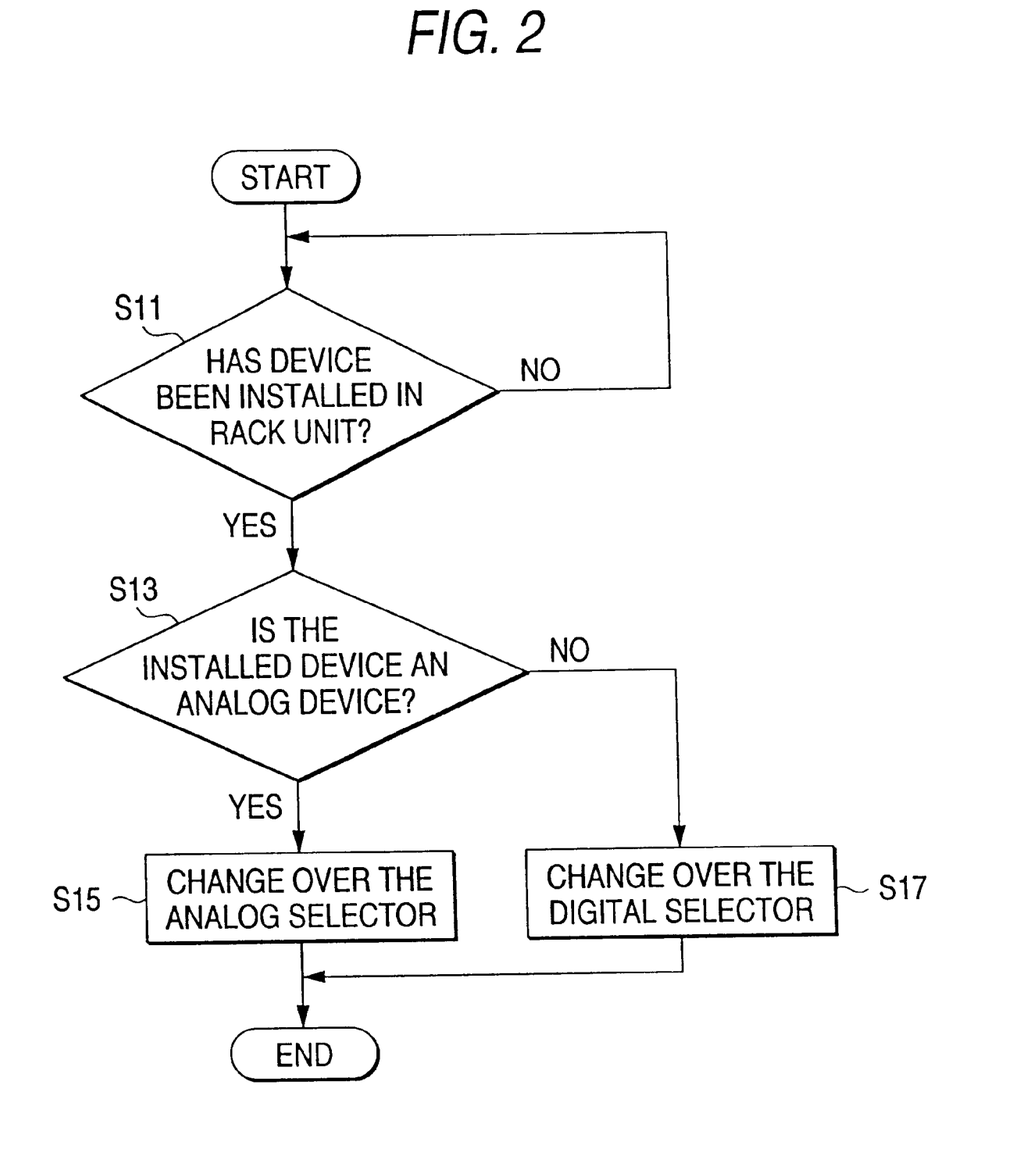
FIG. 2 is a flowchart illustrating the operation for effecting a changeover to the analog selector or the digital selector depending on the device which is installed in the rack unit in accordance with the first embodiment.

FIG. 2 is a flowchart illustrating the operation for effecting a changeover to the analog selector or the digital selector depending on the device which is installed in the rack unit in accordance with the first embodiment. Referring to FIG. 2, a description will be given of the operation for effecting a changeover to the analog selector or the digital selector depending on the device which is installed.

First, on the basis of the device detection signal, the CPU 23 determines whether or not a device has been installed in the device inserting slot 10a of the rack unit 1 (Step S11). Here, if the installation detection signal is at H (1) level, the CPU 23 determines that a device has not been installed in the device inserting slot, and the state is set in an installation waiting state.

On the other hand, if the installation detection signal is at L (0) level, the CPU 23 determines that a device has been installed in the device inserting slot. If the device has been installed in the device inserting slot, the CPU 23 determines whether the installed device is an analog device or a digital device on the basis of the device detection signal (Step S13).

Here, if the device detection signal is at H (1) level, the CPU 23 determines that the device is an analog device, and changes over the analog selector 11 by means of a selector control signal (Step S15).

On the other hand, if the device detection signal is at L (0) level, the CPU 23 determines that the device is a digital device, and changes over the digital selector 14 by means of a selector control signal (Step S17).

By the changeover of the selector, it is possible to configure a ring network system using digital devices, and to input the analog signal from an analog device to the communication IC 13.

As a result, no matter how many digital devices are connected to the device inserting slot 10a and the like, it is possible to automatically configure the ring network system at all times. In addition, even in cases where analog devices are connected to the device inserting slot 10a and the like, analog signals from the analog devices can be outputted to other digital devices by means of the communication IC 13.

Figure 3:
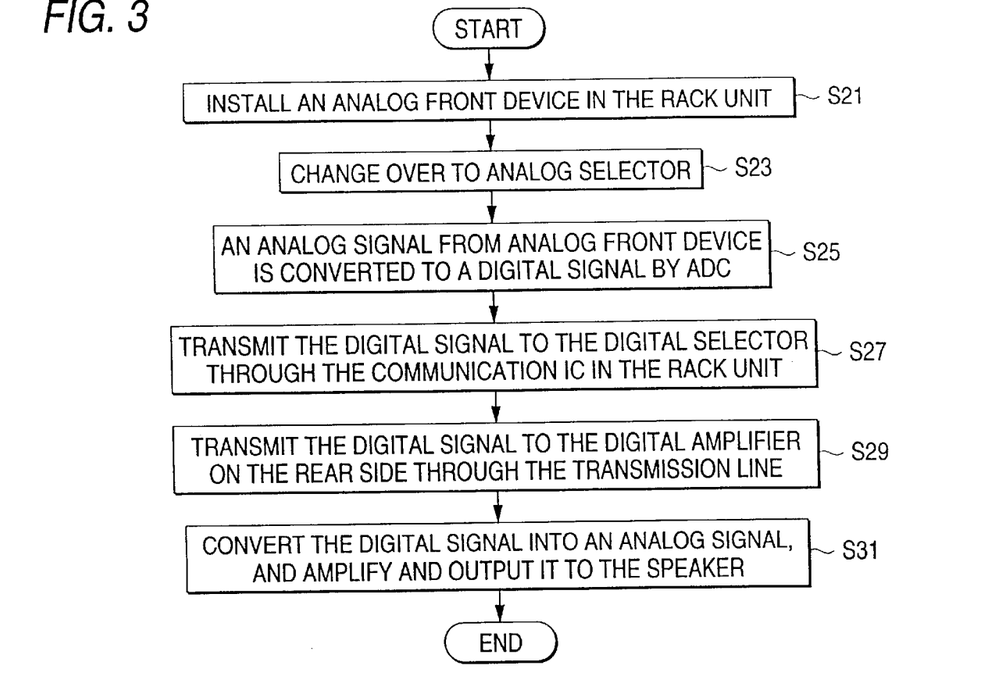
FIG. 3 is a flowchart illustrating the transmission of a signal from an analog front device to a digital amplifier on the rear side in accordance with the first embodiment.

Next, a description will be given of specific operation of the ring network system in the first embodiment shown in FIG. 1. Here, a description will be given of transmission of a signal from an analog front device to the digital amplifier on the rear side. FIG. 3 shows a flowchart of transmission of a signal from an analog front device to the digital amplifier on the rear side in accordance with the first embodiment.

First, when an analog front device, e.g., the CD player 3, is installed in the device inserting slot 10a of the rack unit 1 (Step S21), the CPU 23 effects a changeover to the analog selector 11 (Step S23).

Then, the analog signal from the CD player 3 is inputted to the ADC 12 through the analog selector 11, and the analog signal is converted to a digital signal by the ADC 12 (Step S25).

Then, the digital signal is transmitted to the digital selector 14 through the communication IC 13 in the rack unit 1 (Step S27), and is further transmitted to the communication IC 63 of the digital amplifier 6 on the rear side through the photoelectric conversion circuit 15 and the transmission lines 9a to 9c (Step S29). In the digital amplifier 6, the digital signal is converted to an analog signal and is amplified by the DAC/AMP 62, and the sound can be outputted to the speaker 66 (Step S31).

Thus, even in the case where an analog device is connected, since the connection to the digital device is controlled by the communication IC 13 after conversion of the analog signal from the analog device to the digital signal, devices can be added easily to expand the network.

Figure 4:
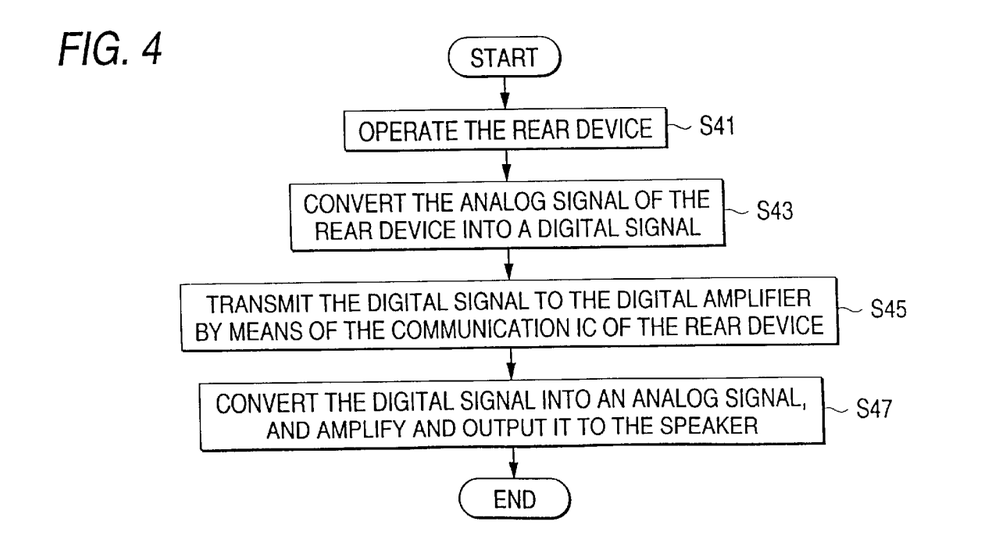
FIG. 4 is a flowchart illustrating the transmission of a signal from a digital device to the digital amplifier on the rear side in accordance with the first embodiment.

Next, a description will be given of transmission of a signal from a digital device to the digital amplifier on the rear side in accordance with the first embodiment. FIG. 4 is a flowchart illustrating the transmission of a signal from a digital device to the digital amplifier on the rear side in accordance with the first embodiment.

First, a rear device, e.g., the CD changer 5, is operated (Step S41), the analog signal from the CD 51 is converted to a digital signal by the ADC 52 (Step S43), and the digital signal is transmitted to the digital amplifier 6 by the communication IC 53 (Step S45). In the digital amplifier 6, the digital signal is converted to an analog signal and is amplified by the DAC/AMP 62, and the sound can be outputted to the speaker 66 (Step S47).

Second Embodiment

Figure 5:
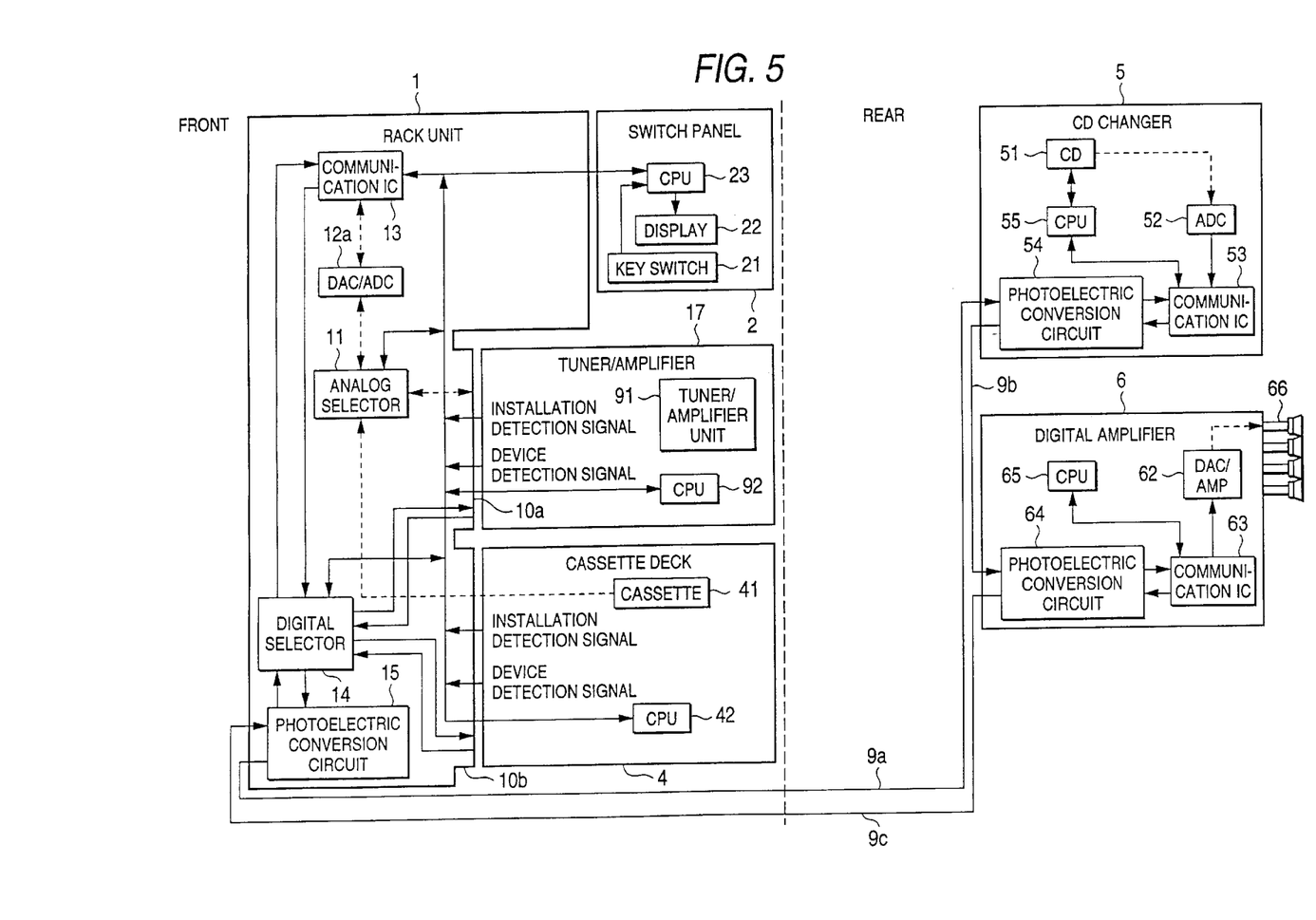
FIG. 5 is a block diagram illustrating the configuration of the ring network system in accordance with a second embodiment of the present invention.

FIG. 5 is a block diagram of the configuration of the ring network system in accordance with a second embodiment of the present invention. The second embodiment is characterized in that analog devices such as a tuner/amplifier 17 and the cassette deck 4 are installed in the rack unit 1, the amplifier is disposed on the front side, and data communication is mutually effected by the analog devices.

The ring network system shown in FIG. 5 comprises the rack unit 1, the switch panel 2, the tuner/amplifier 17, the cassette deck 4, the CD changer 5, and the digital amplifier 6. The tuner/amplifier 17 has a tuner/amplifier unit 91 and a CPU 92.

It should be noted that among the parts shown in FIG. 5, those parts that are identical to the parts shown in FIG. 1 are denoted by the same reference numerals, and a detailed description thereof will be omitted.

Figure 6:
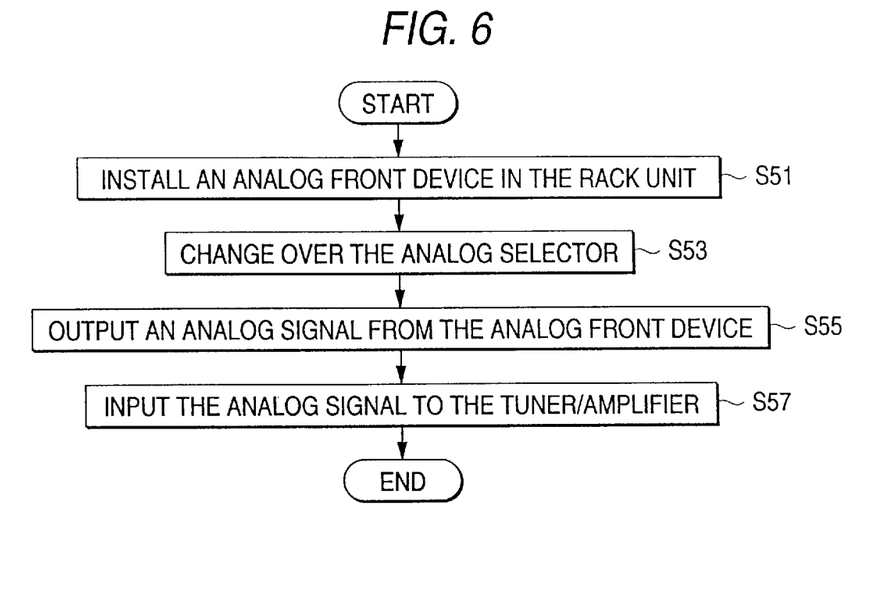
FIG. 6 is a flowchart illustrating the transmission of a signal from an analog front device to an analog amplifier on the front side in accordance with the second embodiment.

Next, referring to the flowchart shown in FIG. 6, a description will be given of transmission of a signal from an analog front device to the analog amplifier on the front side in accordance with the second embodiment.

First, if an analog front device, e.g., the cassette deck 4, is installed in the device inserting slot 10b of the rack unit 1 (Step S51), the CPU 23 changes over the analog selector 11 (Step S53).

Then, the analog signal from the cassette deck 4 is outputted to the analog selector 11 (Step S55), and the analog signal is inputted to the tuner/amplifier 17 which is an analog device on the front side through the analog selector 11 (Step S57).

Thus, even in the case where analog devices are connected, the analog signal from one analog device can be outputted to another analog device.

Figure 7:
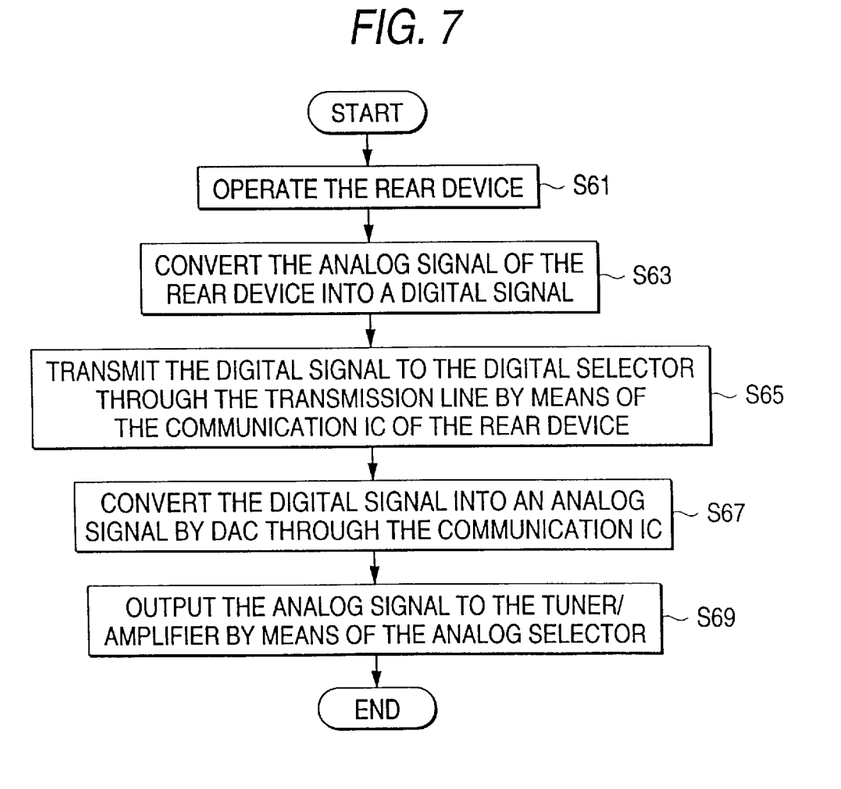
FIG. 7 is a flowchart illustrating the transmission of a signal from a digital rear device to the analog amplifier on the front side in accordance with the second embodiment.

Next, referring to the flowchart shown in FIG. 7, a description will be given of transmission of a signal from a digital rear device to the analog amplifier on the front side in accordance with the second embodiment.

First, a rear device, e.g., the CD changer 5, is operated (Step S61), the analog signal from the CD 51 is converted to a digital signal by the ADC 52 (Step S63), and the digital signal is transmitted to the digital selector 14 through the transmission lines 9b and 9c by the communication IC 53 (Step S65).

Further, the digital signal is converted to an analog signal through the communication IC 13 by a DAC 12a (Step S67), and the converted analog signal is outputted to the tuner/amplifier 17 by the analog selector 11 (Step S69).

Third Embodiment

Figure 8:
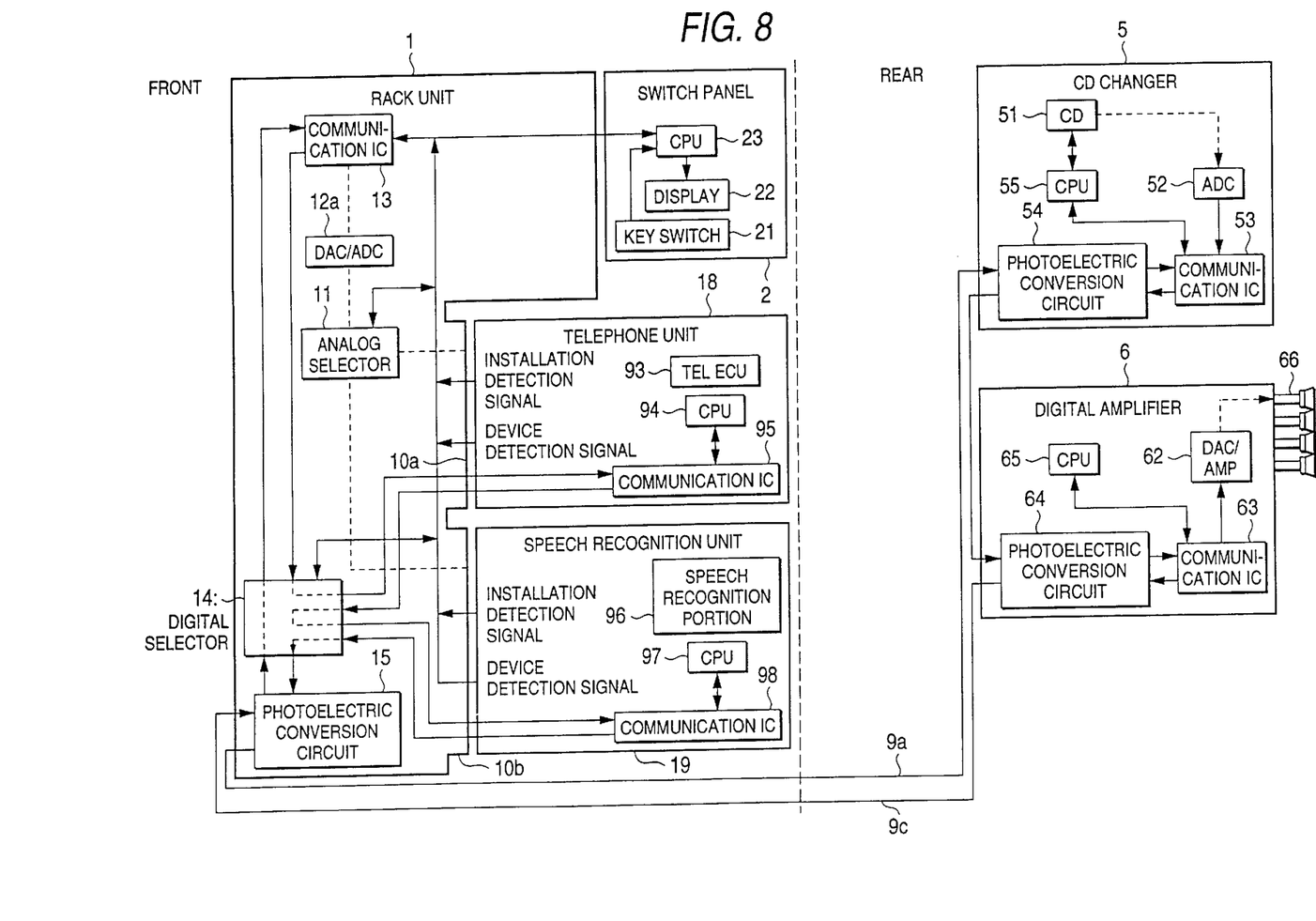
FIG. 8 is a block diagram illustrating the configuration of the ring network system in accordance with a third embodiment of the present invention.

FIG. 8 is a block diagram of the configuration of the ring network system in accordance with a third embodiment of the present invention. The third embodiment is characterized in that digital devices such as a telephone unit 18 and a speech recognition unit 19 are installed in the rack unit 1.

The ring network system shown in FIG. 8 comprises the rack unit 1, the switch panel 2, the telephone unit 18, the speech recognition unit 19, the CD changer 5, and the digital amplifier 6.

The telephone unit 18 has a telephone electronic control unit (TELECU) 93, a CPU 94, and a communication IC 95. The speech recognition unit 19 has a speech recognition portion 96, a CPU 97, and a communication IC 98.

Figure 9:
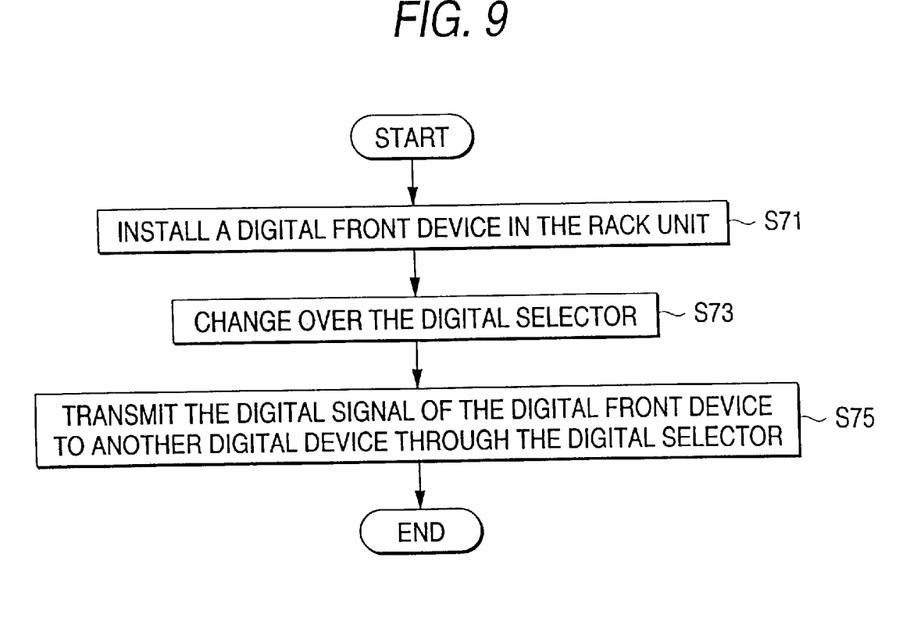
FIG. 9 is a flowchart illustrating the transmission of a signal from a digital front device to another digital device in accordance with the third embodiment.

Next, referring to the flowchart shown in FIG. 9, a description will be given of transmission of a signal from a digital front device to another digital device in accordance with the third embodiment.

First, if a digital front device, e.g., the speech recognition unit 19, is installed in the device inserting slot 10b of the rack unit 1 (Step S71), the CPU 23 changes over the digital selector 14 (Step S73).

Then, the digital signal from the speech recognition unit 19 is outputted to the digital selector 14, and the digital signal is transmitted to another digital device through the digital selector 14 (Step S75).

For example, the digital signal is transmitted to the digital amplifier 6 through the transmission lines 9a and 9b, and in the digital amplifier 6 the digital signal is converted to an analog signal and is amplified by the DAC/AMP 62, and can be outputted to the speaker 66. Namely, even in the case where digital devices are connected, the digital signal from one digital device can be outputted to another digital device.

As described above, even if analog devices or digital devices are connected to the device inserting slots, the ring network system can be configured automatically, so that devices can be added easily to expand the network.

It should be noted that although a description has been given of the case where rear devices are provided in the ring network systems in the first to third embodiments, the present invention is applicable to the case where the rear devices are not provided.

Figure 10:
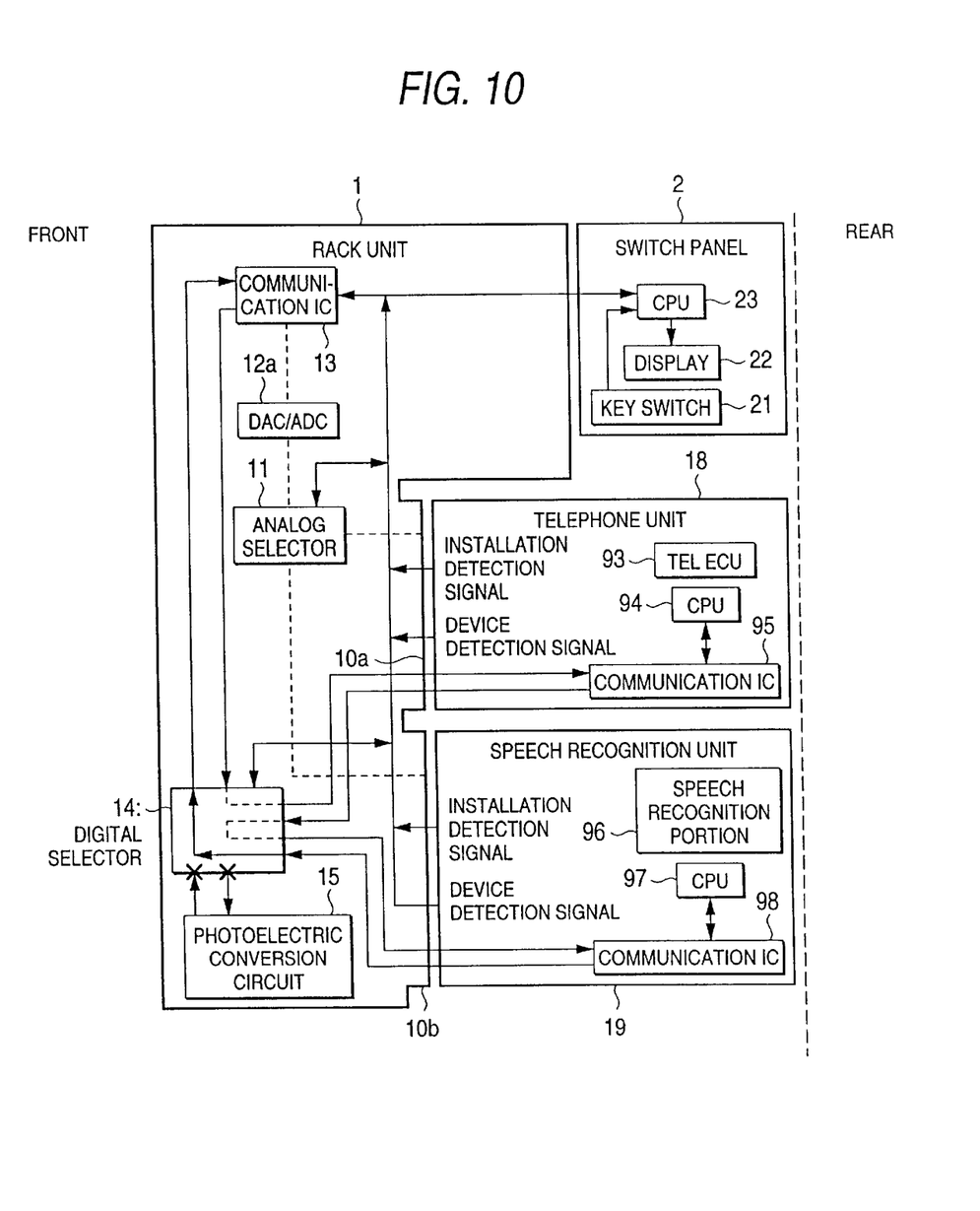
FIG. 10 is a block diagram illustrating the configuration of a modification of the ring network system in accordance with the third embodiment of the present invention.

Referring to FIG. 10, a description will be given of one example in which rear devices are not provided. FIG. 10 shows a block diagram illustrating a modification of the ring network system in accordance with the third embodiment of the present invention.

In the ring network system shown in FIG. 10, the ring network system is configured by the front side only (the case where the rear devices are not provided ), and the presence or absence of the rear devices is confirmed by the following method.

First, after the states of insertion of the devices in the device inserting slots are confirmed by the respective detection signals, the digital selector 14 is changed over in correspondence with their states of connection, and the route of the ring to the photoelectric conversion circuit 15 is formed.

The CPU 23 sends some data to the ring network through the communication IC 13. If the rear device is not present, since the data is interrupted in the photoelectric conversion circuit 15, the communication IC 13 is incapable of receiving the data.

Then, the CPU 23 in the switch panel 2 detects that the ring network has not been properly formed through the communication IC 13, and recognizes that no device is connected to the rear side.

For this reason, the digital selector 14 is changed over so that the ring network can be formed by the front devices only. Namely, the digital selector 14 cuts off the route to the photoelectric conversion circuit 15 (the cutoff of the route is indicated by 'x').

By executing the above processing, in the event that some abnormality has occurred in rear devices or in the rear transmission line, the ring network system can be configured by the front-side devices only.

Fourth Embodiment

Figure 11:
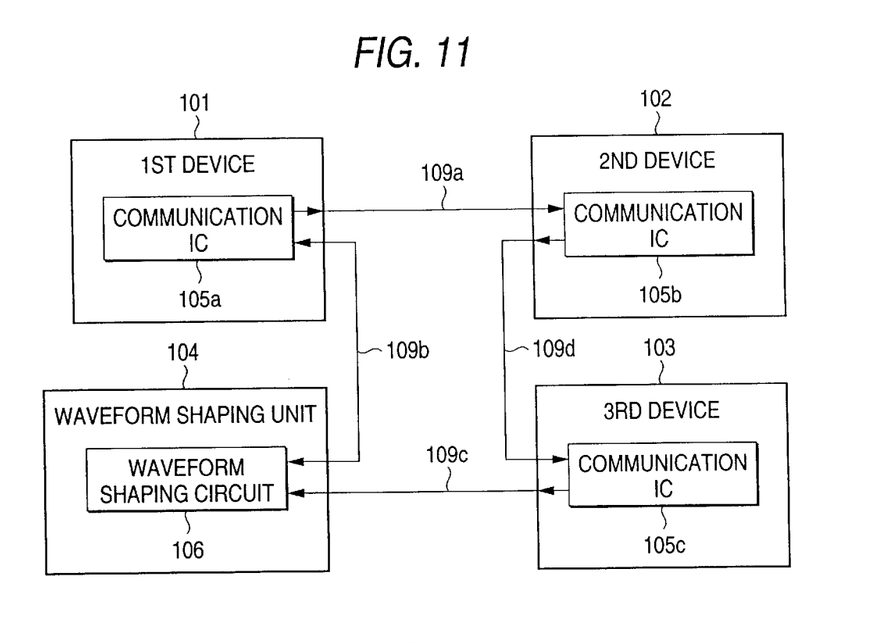
FIG. 11 is a block diagram illustrating the configuration of the ring network system in accordance with a fourth embodiment of the present invention.

FIG. 11 is a block diagram illustrating the ring network system in accordance with a fourth embodiment of the present invention. The ring network system shown in FIG. 11 comprises a first device 101, a second device 102, a third device 103, and a waveform shaping unit 104.

The first device 101 and the second device 102 are provided as standard equipment units, and their positions remain at their original positions. The third device 103 is an added unit. Transmission lines 109a and 109b are existing lines, and their wiring routes and line length have not been changed and remain intact.

The first device 101 has a communication IC 105a, the second device 102 has a communication IC 105b, the third device 103 has a communication IC 105c, and the waveform shaping unit 104 has a waveform shaping circuit 106. The waveform shaping circuit 106 corrects the attenuation, waveform distortion, jitter, and the like of the light signal on the transmission lines 109a to 109d.

The output side of the communication IC 105a and the input side of the communication IC 105b are connected by the transmission line 109a, the output side of the communication IC 105b and the input side of the communication IC 105c are connected by the transmission line 109d, the output side of the communication IC 105c and the input side of the waveform shaping circuit 106 are connected by the transmission line 109c, and the output side of the waveform shaping circuit 106 and the input side of the communication IC 105a are connected by the transmission line 109b.

According to the above-described configuration, the third device 103 can be added to the ring network system to effect expansion without changing the positions of the first device 101 and the second device 102, which are standard equipment units, and the wiring routes of the transmission lines 109a and 109b.

Further, since a relay connector or the like is not used, it is possible to prevent the occurrence of the attenuation of the light signal, waveform distortion, jitter, and the like. Moreover, since the waveform shaping unit 104 is provided, the attenuation, waveform distortion, jitter, and the like of the light signal on the transmission lines 109a to 109d can be corrected, so that communication can be effected properly.

Fifth Embodiment

Figure 12:
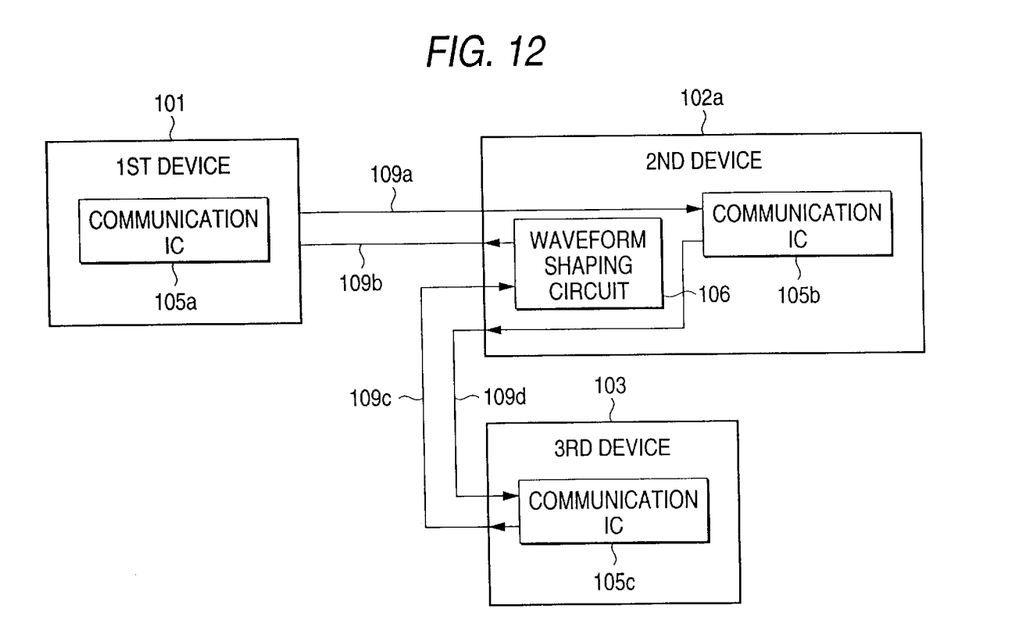
FIG. 12 is a block diagram illustrating the configuration of the ring network system in accordance with a fifth embodiment of the present invention.

FIG. 12 is a block diagram illustrating the ring network system in accordance with a fifth embodiment of the present invention. The fifth embodiment is a modification of the fourth embodiment, and is characterized in that the waveform shaping circuit 106 is provided in a second device 102a.

The output side of the communication IC 105a and the input side of the communication IC 105b are connected by the transmission line 109a, the output side of the communication IC 105b and the input side of the communication IC 105c are connected by the transmission line 109d, the output side of the communication IC 105c and the input side of the waveform shaping circuit 106 are connected by the transmission line 109c, and the output side of the waveform shaping circuit 106 and the input side of the communication IC 105a are connected by the transmission line 109b. According to the above-described configuration, it is possible to obtain an advantage similar to that of the fourth embodiment.

It should be noted that the present invention is not limited to the ring network systems of the above-described embodiments. Although the CPU 23 is provided in the switch panel 2 in the embodiments, the CPU 23 may be provided in the rack unit 1 instead of providing the CPU 23 in the switch panel 2.

Furthermore, although in the first to third embodiments a description has been given of cases where analog devices are installed in both the device inserting slots 10a and 10b, or digital devices are installed in both the device inserting slots 10a and 10b, the system can be automatically configured by, for example, installing an analog device in the device inserting slot 10a and installing a digital device in the device inserting slot 10b. Consequently, devices can be added easily to expand the network.

What is claimed is:

1. A ring network system in which a plurality of network devices each having a first communication control unit for controlling data communication are connected in a ring-like manner by a transmission line to mutually effect transmission and reception of data among the network devices, comprising:

an addition unit disposed between two adjacent ones of said plurality of network devices, said addition unit and said plurality of network devices being connected in the ring-like manner by said transmission line, wherein said addition unit has a plurality of device inserting slots in which a plurality of additional devices are installed and which are provided in correspondence with said plurality of additional devices, a second communication control unit for controlling data communication among said plurality of additional devices installed in said plurality of device inserting slots and for controlling data communication between said additional device and said network devices, and a device determining unit which, on the basis of a signal sent from said additional device installed in said device inserting slot, determines whether said additional device is said network device having said first communication control unit or a non-network device not having said first communication control unit.

2. The ring network system according to claim 1, wherein said plurality of additional devices are said network devices each having said first communication control unit.

3. The ring network system according to claim 1, wherein said plurality of additional devices are non-network devices each not having said first communication control unit.

4. A ring network system in which a plurality of network devices each having a first communication control unit for controlling data communication are connected in a ring-like manner by a transmission line to mutually effect transmission and reception of data among the network devices, comprising:

an addition unit disposed between two adjacent ones of said plurality of network devices, said addition unit and said plurality of network devices being connected in the ring-like manner by said transmission line, and a device determining unit which, on the basis of a signal sent from said additional device installed in said device inserting slot, determines whether said additional device is said network device having said first communication control unit or a non-network device not having said first communication control unit, wherein said addition unit has a plurality of device inserting slots in which a plurality of additional devices are installed and which are provided in correspondence with said plurality of additional devices, and a second communication control unit for controlling data communication among said plurality of additional devices installed in said plurality of device inserting slots and for controlling data communication between said additional device and said network device, and wherein said second communication control unit includes:

a first selecting portion which, when said device determining unit has determined that said additional device is said non-network device, selects said non-network device on the basis of a result of the determination;

a second selecting portion which, when said device determining unit has determined that said additional device is said network device, selects said network device on the basis of a result of the determination;

a converting portion for converting a signal in a first form from said non-network device selected by said first selecting portion into a signal in a second form of said network device; and a communication portion for transmitting the signal in the second form converted by said converting portion to one of said plurality of network devices.

5. The ring network system according to claim 4, wherein said communication portion receives the signal in the second form from said network device on said transmission line, and outputs the same to said converting portion;

said converting portion converts the signal in the second form from said communication portion into the signal in the first form; and said first selecting portion outputs the signal in the first form from said converting portion to said non-network device installed in said device inserting slot.

6. The ring network system according to claim 1, further comprising:

an installation determining unit which, on the basis of the signal sent from said additional device, determines whether said additional device has been installed in said device inserting slot.

* * * * *